Nov. 9, 1965 H. J. BRETTRAGER 3,217,131
TILTABLE DIE SUPPORTING APPARATUS
Filed Oct. 24, 1962 2 Sheets-Sheet 1
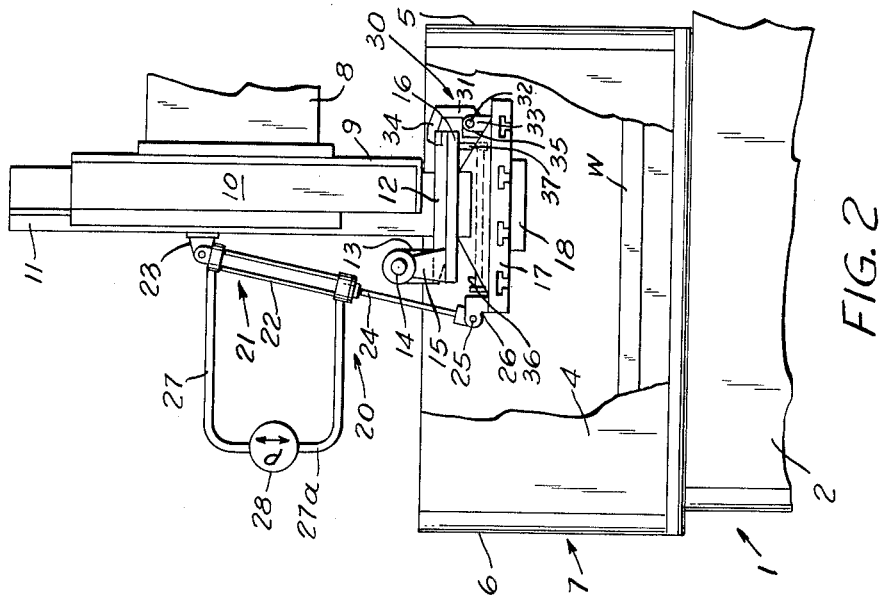
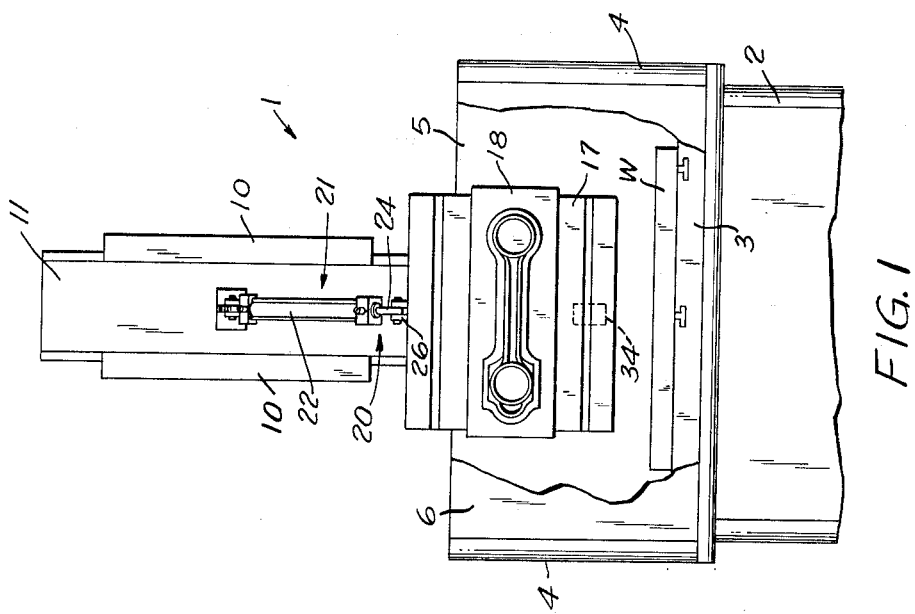
INVENTOR.
HENRY J. BRETTRAGER
BY
ATTORNEYS Nov. 9, 1965 H. J. BRETTRAGER 3,217,131
TILTABLE DIE SUPPORTING APPARATUS
Filed Oct. 24, 1962 2 Sheets-Sheet 2

INVENTOR.
HENRY J. BRETTRAGER
BY
*Learman, Learman, & McCulloch*
ATTORNEYS

United States Patent Office 3,217,131
Patented Nov. 9, 1965

3,217,131
TILTABLE DIE SUPPORTING APPARATUS
Henry J. Brettrager, Saginaw, Mich., assignor to Brettrager Manufacturing Company, Saginaw, Mich., a corporation of Michigan
Filed Oct. 24, 1962, Ser. No. 232,807
7 Claims. (Cl. 219—69)

This invention relates to apparatus for supporting an electrode die or the like on machine tools such as electrical discharge eroding machines, and more particularly pertains to a swingable platen or die support which is capable of being swung from an operative position in which it is positively locked in place to other positions so as to facilitate mounting and dismounting of a die.

Conventional electrical discharge or spark erosion machines require a die to be very carefully fitted to and supported upon the lower surface of a suspended member such as the vertically movable platen of a machine tool. Considerable difficulty has been experienced in mounting the die or the like on the lower surface of the platen because of the necessity of positioning the die between the platen and the opposing member prior to clamping the die in place. Not only is it difficult to position a die accurately on the lower surface of a platen, but the operation also requires the operator to place his hands or arms in a position where they could be injured.

An object of this invention is to provide a platen or similar support for a die or the like which is securely locked when in operative position but is readily tiltable or swingable to such position as to facilitate securing the die to the lower surface of the platen and observing the erosion and position of the electrode.

Another object of the invention is to provide a tiltable platen of the kind indicated which minimizes the possibility of injury to a workman.

Another object of the invention is to provide remotely controlled actuating means for swinging the tiltable platen to and from its operative positions.

A further object of the invention is to provide positively operated latching means for locking the tiltable platen in a selected one of its positions.

Other objects and advantages of the invention will be pointed out specifically or will become apparent from the following description when it is considered in conjunction with the appended claims and the accompanying drawings, in which:

FIGURE 1 is a fragmentary, front elevational view of a machine tool equipped with a tiltable platen constructed in accordance with the invention, the platen being illustrated in its tilted position;

FIGURE 2 is a fragmentary, side elevational view of the apparatus and illustrating the platen in its latched, operative position;

Figure 4:
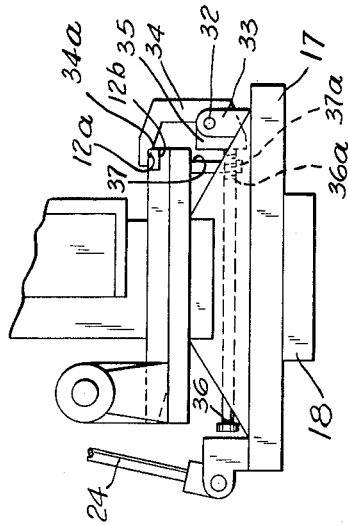
FIGURE 4 is a similarly enlarged, fragmentary, side elevational view with the platen in locked position, illustrating the latch and its operating mechanism.

Apparatus constructed in accordance with the invention is applicable to a large number of different kinds of machines, but for illustrativge purposes it is disclosed as being embodied in an electrical discharge or spark erosion machine 1 having a main supporting base 2 on which is mounted a bed 3 to which a workpiece W may be secured in any suitable manner. Supported on the base 2 are upstanding side and rear walls 4 and 5, respectively, which together with a removable front wall 6 provide a fluid-tight, open top tank 7 for the reception of coolant.

Fixed on the base 2 is a support member having an arm 8 which overhangs the tank 7 and to which is fixed a slideway 9 having a pair of parallel guides 10. Slideably mounted in the slideway 9 is a vertically reciprocable slide member 11 that terminates at its lower end in a block 12. The slide 11 may be reciprocated vertically by any conventional means.

To the upper surface of the plate 12 is fixed a pair of mounting brackets 13 between which extends a shaft 14. Journaled on the shaft is a pair of mounting ears 15 which are fixed to and support a platen or mounting plate 16 that is capable of swinging about the axis of the shaft 14.

Secured to the under surface of the platen 16 is a die support member 17 which is adapted to support any one of a number of dies or the like thereon. As illustrated in the drawings, the die support has removably secured thereto a die 18 which is of substantially smaller size than the support 17, but dies either larger or smaller than the die 18 may be similarly supported.

Pressure fluid actuating means designated generally by the reference character 20 is provided to effect swinging movements of the platen 16 and the apparatus supported thereby. In the disclosed embodiment of the invention, the actuating means 20 comprises a preferably hydraulic ram 21 including a conventional double-acting cylinder 22 that is pivoted at its closed end to a bracket 23 which is fixed to the slide 11 so as to be reciprocable with the latter. Reciprocably mounted in the cylinder 22 is a piston to which is connected one end of a piston rod 24, the opposite end of the latter being pivoted as at 25 to a bracket 26 that is fixed to the support member 17. At its ends the cylinder 22 is provided with conduits 27, 27a which are in communication with the interior of the cylinder and with a reversible pump 28 which may be electrically driven in either of two directions so as selectively to effect extension and retraction of the piston rod 24.

The apparatus includes a latching mechanism 30 for releasably locking the platen 16 and the apparatus supported thereby in operative position. The latch mechanism comprises a latch member 31 that is pivoted as at 32 on a bracket 33 which is fixed to the die support 17. One end of the latch member 31 terminates in a latching pawl 34 having a hardened inclined surface 34a which is adapted to overlie and grip the correspondingly inclined surface 12a forming the bottom of a groove of substantially the width of pawl 34 formed in a hardened insert block 12b secured on the one end of the plate 12. The other end of the latch member 31 terminates in a block 35, a portion of which extends beyond the pivot 32 in a direction away from the pawl 34.

Means for operating the latch mechanism comprises an elongated bolt 36 which is rotatably received in an opening formed in the die carrier 17 and has a threaded portion 36a that is received in a correspondingly threaded opening 37a formed in a plate 37 that depends from the platen 16. The bolt 36 is so positioned that it is capable of engaging the block 35 of the latch member 31 at a point to one side of the pivot 32, whereby forcible engagement between the bolt and the block will tend to rock the latch member 31 counterclockwise, as is viewed in FIGURE 2, toward its latching position. When the member 31 is latched the surfaces 34a and 12a are in wedged relationship.

The condition of the parts of the apparatus illustrated in FIGURE 2 is such as to enable operation of the apparatus as either a spark erosion or electrical discharge machine. When it is desired to replace the die 18 with another die, the lock bolt 36 may be rotated in such direction as to cause it to be withdrawn from engagement with the block 35, whereupon the latch member 31 can be rocked clockwise, as viewed in FIGURE 2, thereby releasing the latch member from the member 12. Following the release of the latch member, the pump 28 may be driven in such direction as to cause the piston rod 24 to be retracted into the cylinder 22, thereby causing the platen 16 and the parts supported thereby to be rocked in a clockwise direction from the operative position shown in FIGURE 2 to the inoperative position shown in FIGURE 3.

Figure 3:
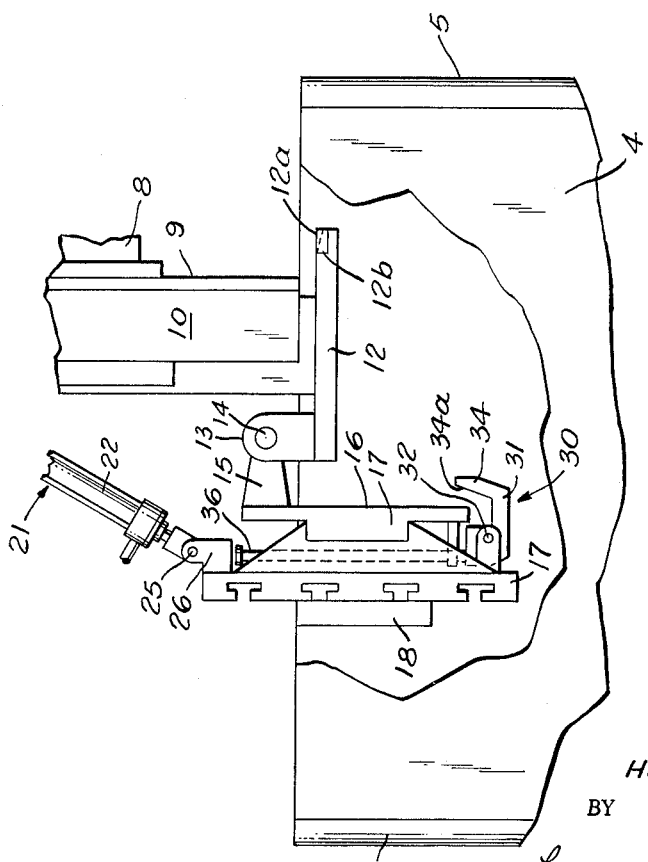
FIGURE 3 is an enlarged fragmentary view similar to FIGURE 2, but illustrating the platen in its tilted position.

When the platen and its associated parts are in the position illustrated in FIGURE 3, they will be maintained in such position by the fluid pressure in the system of the ram 21, thereby facilitating removal of the die 18 and substitution therefor of another die, all without necessitating a workman's positioning his hands or arms between the platen and the base 4.

When the substitution of dies has been effected, the pump 28 may be driven in such direction as to return the platen and its associated parts to their operative positions. The parts again may be positively locked in their operative positions by operation of the latch locking mechanism.

An additional advantage of the latching mechanism 30 is that it enables the die supporting apparatus to be positively retained in operative position so that the pump 28 can be deenergized in the event of a failure of the pressure fluid actuating mechanism. As a consequence, the likelihood of injury either to a workman or to dies and workpieces because of a failure in the pressure fluid system is minimized.

The disclosed embodiment is representative of a presently preferred form of the invention, but is intended to be illustrative rather than definitive thereof. The invention is defined in the claims.

What is claimed is:

1. Apparatus comprising a main support member; a fluid tank under said main support member; first support means in said tank; second support means aligned above said first support means; means mounting said second support means on said main support member for swinging movements relative thereto from a first generally horizontal position on the bottom of said main support member to a generally vertical position, means for securing a workpiece to one of said support means and a die electrode to the other support means; power operated acuating means interconnecting said main support member and said second support means operable to swing the latter relatively to said main support member between said first position and said generally vertical position and locking means engageable between said second support means and main support member for locking the second support member in said first position.

2. Apparatus for supporting a die or the like comprising a main support member; a die support member; means mounting said die support member on said main support member for swinging movements relative thereto from a first generally horizontal position on the bottom of said main support member to generally vertical position; actuating means interconnecting said main support member and said die support member operable to swing the latter relatively to said main support member between said first position and said generally vertical position; and locking means on one of said support members engageable with the other of said support members when said support members are in one relative position for releasably locking said members in said first position.

3. Apparatus for supporting a die or the like comprising a main support member; a die support member; means mounting said die support member on said main support member for swinging movements relative thereto from a first generally horizontal position on the bottom of said die support member to a generally vertical position; actuating means interconnecting said main support member and said die support member operable to swing the latter relatively to said main support member; a latch member pivoted between its ends on said die support member, said latch member having a latch pawl at one of its ends with an upwardly inclined surface adapted to engage a like surface on said main support member; and locking means engageable with the other end of said latch member for locking said latch member in latching engagement with said main support member.

4. The apparatus set forth in claim 3 wherein said locking means comprises a rotatable member supported by said die support member and rotatable into and out of abutting engagement with said other end of said latch member.

5. The combination defined in claim 2 in which said locking means is operable independently of said actuating means.

6. The combination defined in claim 2 in which said actuating means is connected near one edge of said die support member, and said locking means comprises a generally vertically extending, hook-shaped latch mounted on the opposite edge of said die support member to be swung up over said main support member.

7. The combination defined in claim 6 in which operating means is provided on one of said members, engageable with said latch when said die support member is in horizontal position, for selectively locking and unlocking the latch.

References Cited by the Examiner
UNITED STATES PATENTS

| | | | |
|---|---|---|---|
| 2,256,246 | 9/41 | Geibel | 219—87 |
| 2,323,696 | 7/43 | Weightman | 219—87 |
| 2,765,394 | 10/56 | Griffith | 219—69 |
| 2,778,924 | 1/57 | Hill | 219—69 |

RICHARD M. WOOD, *Primary Examiner.*